July 13, 1926.
E. ADAMS
AUTOMATIC ELECTRICAL CUT-OUT
Filed March 8, 1924
1,592,321
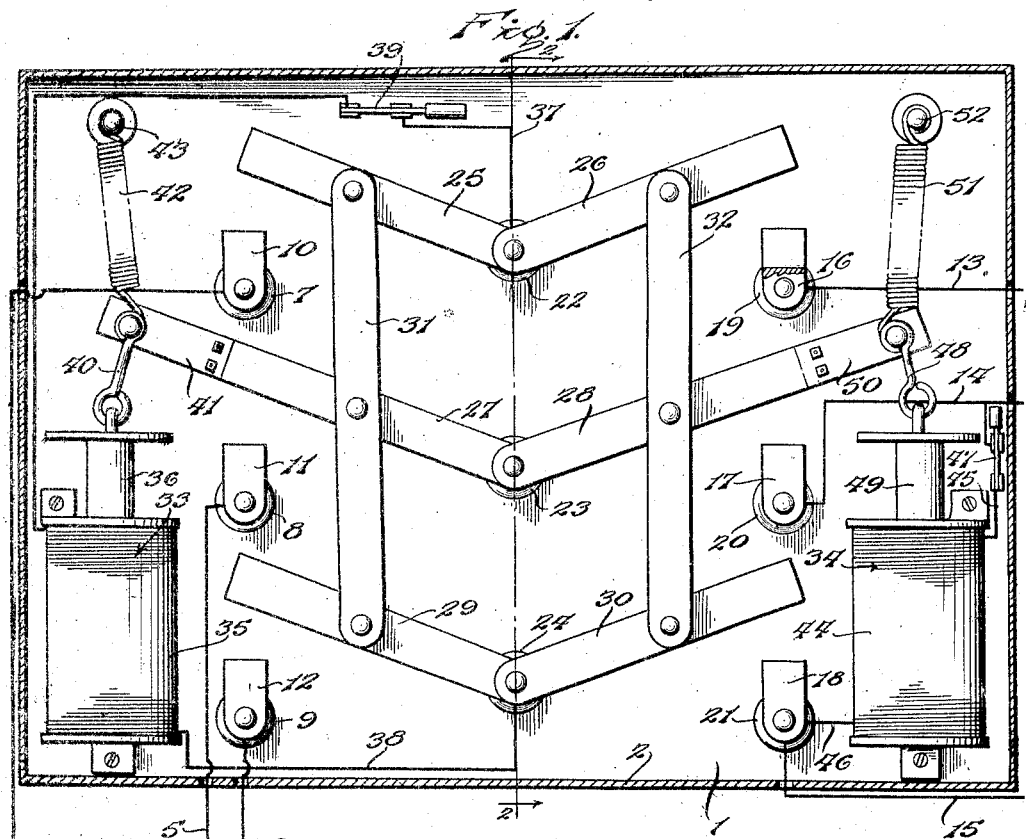
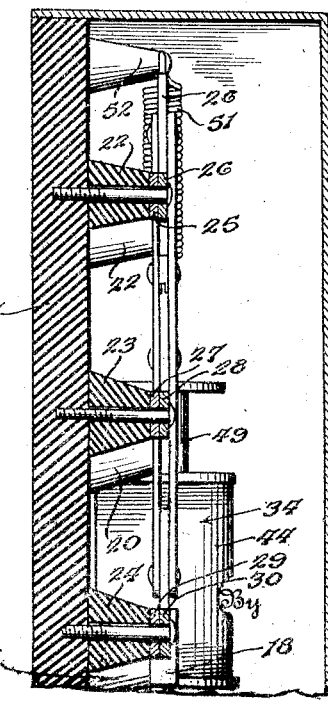
Inventor
E. Adams
By Lacey & Lacey, Attorney Patented July 13, 1926.

1,592,321

UNITED STATES PATENT OFFICE.

ERVIN ADAMS, OF NANTY GLO, PENNSYLVANIA, ASSIGNOR OF THREE-TENTHS TO A. H. McANULTY, OF NANTY GLO, PENNSYLVANIA.

AUTOMATIC ELECTRICAL CUT-OUT.

Application filed March 8, 1924. Serial No. 697,786.

This invention relates to improvements in automatic cut-outs for electric switches and more particularly to a cut-out for employment in connection with a polyphase motor. Heretofore difficulty has been experienced and great expense incurred in the operation of polyphase motors as, for example, a tri-phase motor, through breaking of any of the leads to the motor and due to the fact that, so far as I am aware, no automatic cut-out has yet been devised, which will operate with certainty to break the circuit to the motor and prevent the motor being burned out. In some types of cut-outs designed for employment in tri-phase motors, a breakage of either one of two wires will result in automatic operation of the cut-out to completely open the circuit and cut-off the supply of current to the motor, but in the event of breakage of the third lead, such cut-outs do not operate with certainty and there is extreme liability of burning out of the motor because of the continued supply of current thereto after the motor has ceased to function. It is, therefore, the primary object of the present invention to provide an automatic cut-out which, while designed for employment in connection with a tri-phase motor, may, by slight modification, be adapted for employment in connection with other polyphase motors and which will operate with certainty and automatically to break the circuit in the event of breakage of any one or more of the leads to the motor.

Another object of the invention is to provide means insuring of a positive actuation of the switch blades of the device in the event of breakage of any of the leads to the motor so that there can be no sticking of the parts as might otherwise occur in the absence of such means.

Another object of the invention is to provide for manual opening of the circuit in the event this should become necessary.

In the accompanying drawings:

Figure 1 is a view in elevation of the cut-out embodying the invention, the casing for the mechanism being shown in section;

Figure 2 is a vertical front to rear sectional view through the cut-out taken substantially in a plane midway between the ends of the panel of the cut-out.

The cut-out embodying the invention comprises a panel 1 of insulating material such as slate or the like and which panel is preferably of general rectangular form and has fitted thereto the open side of a casing 2 which is designed to enclose the operating parts of the cut-out so as to exclude dust and other accumulations of foreign matter and to prevent tampering with the component parts of the cut-out. The polyphase motor, which in this instance is of the tri-phase type, is illustrated diagrammatically in Figure 1 of the drawings and is indicated by the numeral 3. Conductor wires 4, 5 and 6 are connected to the binding posts of the motor and serve to conduct current to the several phase windings of the motor. Fixed upon the base of the panel 1 in a vertical series are insulating posts 7, 8 and 9 which respectively support forked or bifurcated contacts 10, 11 and 12. The wires 4, 5 and 6 are led to and are electrically connected with the several contacts 10, 11, and 12, respectively, the wires being led into the casing provided by the cover member 2, in any suitable manner. The main leads or conductor wires from the source of current supply are indicated by the numerals 13, 14 and 15 and they are connected, respectively, to terminal contacts of the same character as the contacts 10, 11 and 12 and indicated respectively by the numerals 16, 17 and 18, these contacts being mounted upon insulating posts 19, 20 and 21 arranged in a vertical series parallel and opposite to the series of contacts 10, 11 and 12. Thus the contacts 10 and 16, 11 and 17, and 12 and 18 are located opposite each other in horizontal alinement.

Mounted upon the panel 1 in vertical alinement between the posts 7, 8 and 9, and 19, 20 and 21, heretofore referred to, are insulating posts 22, 23 and 24. Pivotally supported by the post 22 are switch blades 25 and 26, the pivoted inner ends of the blades being in electrical contact with each other as clearly shown in Figure 2. Other blades 27 and 28 are similarly pivotally mounted upon the post 23 and in like manner blades 29 and 30 are pivotally mounted upon the post 24. The blades 25, 27 and 29 are designed to coact respectively with the contacts 10, 11 and 12 and in their pivotal movement they are held in spaced relation and caused to move in parallelism through the medium of a connecting bar 31 of insulating material such as fiber or the like. It will at this point be evident that in the downward swinging movement of the switch blades 25, 27 and 29, they will be simultaneously brought into engagement in the kerfs of the contacts 10, 11 and 12, respectively, and that in the upward swinging movement of the blades they will simultaneously disengage from the said contacts. The blades 26, 28 and 30 are designed to coact respectively with the contacts 16, 17 and 18 and they are connected for movement in unison and in parallelism by means of a connecting member 32 which corresponds in function and in arrangement to the member 31 and is of insulating material. At this point it will be evident that both series of blades are so connected that they will move in unison but the two series may be moved independently one of the other.

Referring now to Figure 1 is will be evident that when the blades 25 and 26 are in electrical engagement with the contacts 10 and 16, respectively, current will flow from the conductor wire or lead 13 through the contact 16, blade 26, blade 25, contact 10, and through the wire 4 to one phase winding of the motor 3. Similarly, when the blades 27 and 28 are in electrical engagement with the contacts 11 and 17, current will flow through the wire 14, the contact 17, the blade 28, the blade 27, the contact 11, and through the wire 5 to another phase winding of the motor; and, when the blades 29 and 30 are swung downwardly into electrical contact with the contacts 12 and 18, current will flow through the wire 15, the contact 18, blade 30, blade 29, contact 12, and through the wire 6 to the third phase winding of the motor. It is, of course, necessary, that when the motor is operating under normal conditions, all of the blades 25, 26, 27, 28, 29 and 30 be lowered into engagement with their respective contacts so that current will flow from the leads 13, 14 and 15 through the blades and their respective contacts and through the wires 4, 5 and 6, respectively, to the several phase windings of the motor, and in order that this adjustment of the several blades may be automatically effected at the time the current is turned on, means is provided which will now be described.

The automatic adjustment of each set of three blades is accomplished through the energization of two solenoids indicated one by the numeral 33 and the other by the numeral 34. The solenoid 33 comprises the usual winding 35 and core 36. A conductor wire 37 leads from the pivot for the switch blades 25 and 26 to one terminal of the winding 35, and a conductor wire 38 leads from the other terminal of the winding 35 to the pivot for the switch blades 29 and 30, a manually operable switch, as, for example, of the single throw knife blade type, indicated by the numeral 39, being interposed in the conductor wire 37, for a purpose to be presently explained. At this point it will be evident that when the current is turned on, it will flow through the wire 13 to the contact 16, blade 26, and wire 37 to the winding 35 of the solenoid 33 and, passing through the winding and energizing the solenoid, will flow through the wire 38, blade 30, contact 18, and wire 15 back to the source of supply. The energization of the solenoid winding will result in retraction of the core 36 and as this core is connected by a link 40 with an extension 41 of insulating material upon the free end of the blade 27, this blade will be swung downwardly. As the other blades 25 and 29 are caused to move in unison with the blade 27 due to the connection 31, all of the said blades 25, 27 and 29 will, as a consequence, be caused to simultaneously electrically engage the contacts 10, 11 and 12. A tension spring 42 is connected at one end to the point of connection of the link 40 with the insulating extension 41 and at its other end to a fixed stud 43 upon the panel and it will be evident that the retraction of the core 36 through energization of the solenoid winding will be against the tension of the said spring 42. It will likewise be understood that upon de-energization of the winding of the solenoid, the spring 42 will immediately act to positively withdraw the core 36 and move the switch blades 25, 27 and 29 out of electrical engagement with the contacts 10, 11 and 12, respectively, until they assume substantially the position shown in Figure 1 of the drawings.

Tracing the circuits illustrated in Figure 1 it will be evident that when the current is turned on, the solenoid 34 will have its winding 44 energized simultaneously with the energization of the winding of the solenoid 33, inasmuch as a conductor wire 45 is tapped to the lead 14 and leads to one terminal of the said winding 44, a wire 46 being connected to the other terminal of the solenoid winding and electrically connected to the contact 18 to which the lead 15 is likewise connected. A manually operable switch 47 of the same type as the switch 39 is interposed in the wire 45. A link 48 is connected to the core 49 of the solenoid 34 and to an extension 50 of insulating material fixed to the outer end of the blade 28, a tension spring 51 being connected at its lower end to the connection of the link 48 with the extension 50 and at its upper end to a fixed stud 52 upon the panel 1. The spring 51 serves precisely the purpose of the spring 42 and it will now be evident that when the current is turned on from the source of supply, both solenoids 33 and 34 will be energized thus effecting a downward swinging movement of all of the switch blades into electrical engagement with their respective contacts and thereby closing the circuit through the several phase windings of the motor 3.

The motor 3, being in operation, let it be assumed that the lead 13 becomes broken or disconnected. Current will then cease to flow through the winding of the solenoid 33 and the solenoid will be de-energized. The spring 42 will then immediately withdraw the core 36, effecting an upward swinging movement of the switch blades 25, 27 and 29 and thereby breaking the circuit to the motor through all three of the wires 4, 5 and 6. Should either of the leads 14 or 15 become broken or disconnected the circuit through the winding 44 of the solenoid 34 will be broken and this solenoid will be de-energized whereupon the spring 51 will withdraw the core 49 and swing the three blades 26, 28 and 30 upwardly, thus breaking the circuit through the wires 13, 14 and 15 to the wires 4, 5 and 6 through the switch blades. It will be obvious, therefore, that a breakage or disconnection of any of the wires 13, 14 and 15 will result in immediate automatic operation of the cut-out to prevent any further flow of current through the wires which remain intact, and to the motor so that there can be no burning out of the motor winding in the event of such a contingency.

If for any reason it should become necessary to manually open the circuit, either of the manually operable switches 39 or 47 may be swung open, thereby respectively de-energizing the solenoid 33 or the solenoid 34 and producing the same result as though the cut-out were operating automatically.

Having thus described the invention, what is claimed as new is:

An automatic cut-out for a polyphase motor circuit, the same comprising a primary set of contacts, one for each phase of the motor, a secondary set of contacts for the current supplying leads, a pair of switch blades for corresponding contacts of the two sets pivotally connected and supported at their inner ends, independent means connecting the blades of each set but insulated therefrom, electro-magnetic operating means for one set of switch blades having the terminals of its windings connected with two of said primary set of contacts, electro-magnetic operating means for the other set of switch blades having the terminals of its windings connected with two of the secondary set of contacts, and means for disengaging the switch blades from the contacts when either of the electro-magnetic operating means becomes de-energized.

In testimony whereof I affix my signature.

ERVIN ADAMS. [L. S.]